(12) United States Patent (10) Patent No.: US 10,583,759 B2
Yagi et al. (45) Date of Patent: Mar. 10, 2020

(54) VEHICLE SEAT

(71) Applicant: TOYOTA JIDOSHA KABUSHIKI KAISHA, Toyota-shi, Aichi-ken (JP)

(72) Inventors: Yuji Yagi, Seto (JP); Keiichi Kondo, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/148,527

(22) Filed: Oct. 1, 2018

(65) Prior Publication Data

US 2019/0126794 A1    May 2, 2019

(30) Foreign Application Priority Data

Oct. 31, 2017    (JP) .................................. 2017-210866

(51) Int. Cl.
*B60N 2/70* (2006.01)
*B60N 2/68* (2006.01)
*B60N 2/72* (2006.01)

(52) U.S. Cl.
CPC ........... *B60N 2/7094* (2013.01); *B60N 2/686* (2013.01); *B60N 2/72* (2013.01)

(58) Field of Classification Search
CPC ......... B60N 2/7094; B60N 2/686; B60N 2/72
USPC ............ 297/452.56, 452.13, 452.18, 452.55, 297/216.13
See application file for complete search history.

(56) References Cited

U.S. PATENT DOCUMENTS

| | | | | |
|---|---|---|---|---|
| 4,023,860 A | * | 5/1977 | Harder, Jr. ............. | B60N 2/242 297/283.3 |
| 4,583,783 A | * | 4/1986 | Kanai .................... | A47C 7/282 297/452.56 |
| 5,582,463 A | * | 12/1996 | Linder .................... | A47C 5/06 297/218.5 |
| 6,371,561 B1 | * | 4/2002 | Iwamoto ................. | B60N 2/68 297/452.18 |
| 6,416,125 B1 | * | 7/2002 | Shah .................... | B60N 2/2222 297/216.12 |
| 6,604,788 B1 | * | 8/2003 | Humer ................. | B60N 2/4228 297/216.13 |
| 6,789,846 B2 | * | 9/2004 | Humer ................. | B60N 2/4228 297/216.12 |
| 7,044,544 B2 | * | 5/2006 | Humer .................. | B60N 2/888 297/216.12 |
| 7,325,869 B2 | * | 2/2008 | Braune ................ | B60N 2/4228 297/216.12 |
| 7,503,627 B2 | * | 3/2009 | Kawasaki ............. | A47C 7/029 297/452.56 |

(Continued)

FOREIGN PATENT DOCUMENTS

| | | |
|---|---|---|
| JP | 2005-132155 A | 5/2005 |
| JP | 2011-116291 A | 6/2011 |

*Primary Examiner* — Syed A Islam
(74) *Attorney, Agent, or Firm* — Oliff PLC

(57) ABSTRACT

There is provided a vehicle seat including: a frame member that structures a frame of a seatback; a pair of supporting members that extend in a seat vertical direction, and that are supported by the frame member at a seat upper side and a seat lower side; a fabric spring member that has elasticity and is stretched between the pair of supporting members; and a spanning member that is provided extending between the pair of supporting members, so as to impart tension to the fabric spring member.

5 Claims, 5 Drawing Sheets

(56) References Cited

U.S. PATENT DOCUMENTS

| | | | | |
|---|---|---|---|---|
| 7,618,096 B2* | 11/2009 | Fujita | ................... | B60N 2/7094 |
| | | | | 297/452.56 |
| 8,047,606 B2* | 11/2011 | Matsui | ................... | F16C 1/101 |
| | | | | 297/216.12 |
| 8,590,979 B2* | 11/2013 | Matsumoto | .......... | B60N 2/4228 |
| | | | | 297/216.13 |
| 8,833,857 B2* | 9/2014 | Hara | ....................... | B60N 2/68 |
| | | | | 297/344.1 |
| 8,840,178 B2* | 9/2014 | Mitsuoka | ................. | B60N 2/20 |
| | | | | 297/216.13 |
| 8,870,292 B2* | 10/2014 | Sakai | ................... | B60N 2/7017 |
| | | | | 297/452.14 |
| 8,939,504 B2* | 1/2015 | Abe | ..................... | B60N 2/7094 |
| | | | | 297/216.13 |
| 9,073,469 B2* | 7/2015 | Fujikawa | ................. | B60N 2/72 |
| 9,586,508 B2* | 3/2017 | Yasuda | .................... | B60N 2/80 |
| 9,783,088 B2* | 10/2017 | Akaike | ............... | B60N 2/5657 |
| 2013/0134749 A1* | 5/2013 | Awata | ................. | B60N 2/5825 |
| | | | | 297/216.13 |
| 2018/0093598 A1* | 4/2018 | Higashihara | ......... | B60N 2/7094 |
| 2018/0126887 A1* | 5/2018 | Higashihara | ......... | B60N 2/7094 |

* cited by examiner

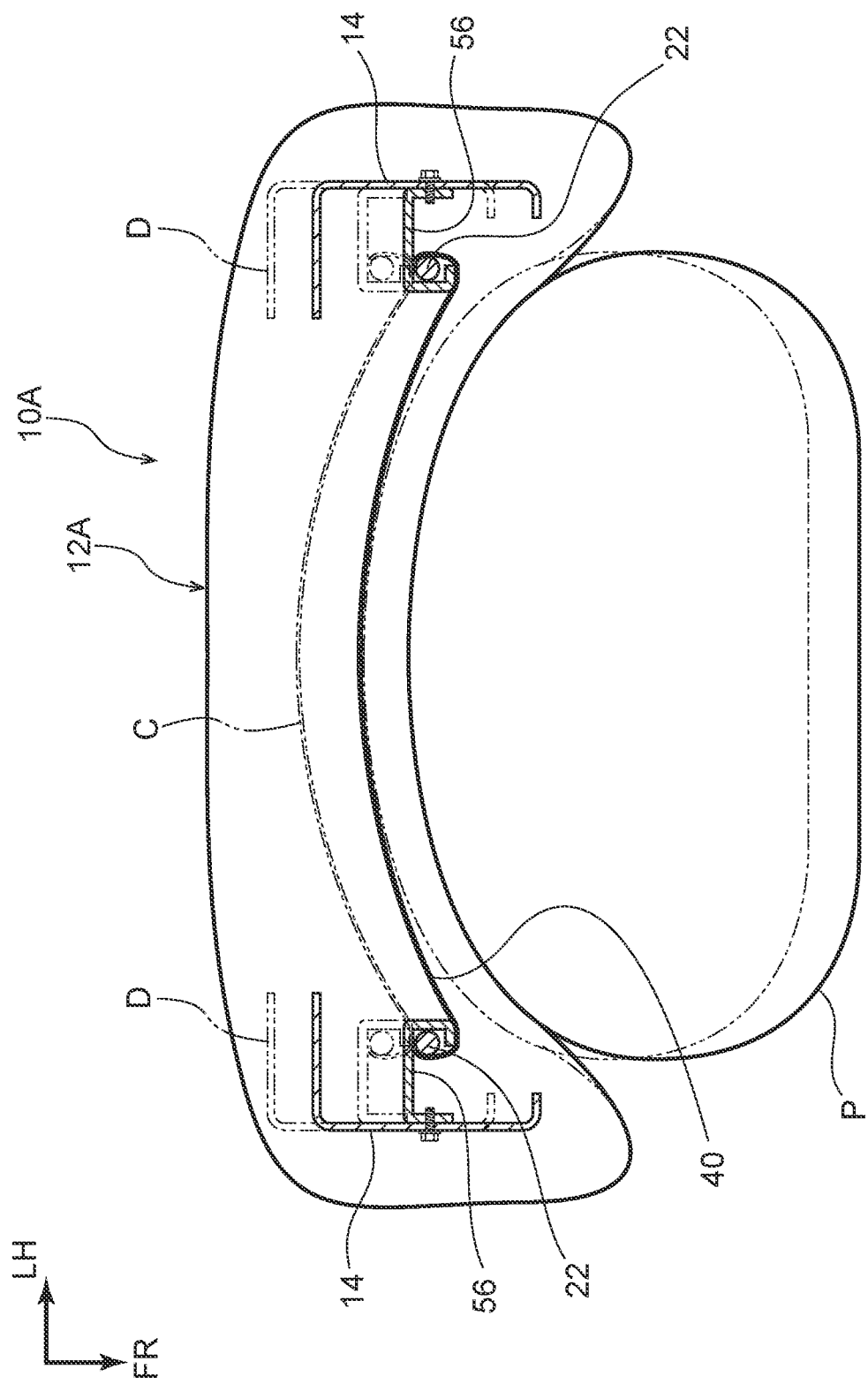

VEHICLE SEAT

CROSS-REFERENCE TO RELATED APPLICATION

This application is based on and claims priority under 35 USC 119 from Japanese Patent Application No. 2017-210866 filed on Oct. 31, 2017, the disclosure of which is incorporated by reference herein.

BACKGROUND

Technical Field

The present disclosure relates to a vehicle seat.

Related Art

Japanese Patent Application Laid-Open (JP-A) No. 2005-132155 discloses a vehicle seat that has a net (a contour mat) that is supported at a seatback frame. In this vehicle seat, tension is imparted to the net due to the net being anchored on side portions (side frames) of the seatback frame.

However, in a vehicle seat such as described above, at the time of a rear collision of the vehicle, the net and the seatback frame tilt rearward together, and the headrest moves away from the head portion of the vehicle occupant.

Therefore, there are limits to reducing the load to the neck portion of the vehicle occupant.

SUMMARY

An object of the present disclosure is to provide a vehicle seat that can reduce load to the neck portion of a vehicle occupant.

A vehicle seat of a first aspect includes: a frame member that structures a frame of a seatback; a pair of supporting members that extend in a seat vertical direction, and that are supported by the frame member at a seat upper side and a seat lower side; a fabric spring member that has elasticity and is stretched between the pair of supporting members; and a spanning member that is provided extending between the pair of supporting members, so as to impart tension to the fabric spring member.

The first aspect is applied to a vehicle seat in which the upper body of a vehicle occupant is held by a fabric spring member that is provided at the interior of the seatback. Here, tension is imparted to the fabric spring member, that is stretched between the pair of supporting members, due to the supporting members being moved away from one another. Further, at this vehicle seat, tension is imparted to the fabric spring member due to the spanning member being provided so as to span across in the state in which the respective supporting members are moved away from one another. On the other hand, the spanning member is structurally independent from the frame member. Further, the supporting members are supported at the frame member, directly or indirectly via other members, at the seat upper side and at the seat lower side. Namely, the seat vertical direction centers of the supporting members are not restrained by the frame member, and can flex toward the seat rear side.

In accordance with the vehicle seat of the first aspect, in a case in which the vehicle is collided with from the rear and the seatback receives load from the vehicle occupant, the fabric spring member elastically deforms, and, due to the supporting members flexing, the vehicle occupant can be made to sink-into the seatback. Further, as a result of the vehicle occupant sinking into the seatback, rearward tilting of the seatback is suppressed, and the distance between the headrest and the head portion of the vehicle occupant does not increase. Therefore, the load to the neck portion at the time when the head portion bends rearward can be lessened.

A vehicle seat of a second aspect further includes a connecting member that extends in a seat transverse direction and connects the pair of supporting members at one side in the seat vertical direction of the respective supporting members, wherein the spanning member is provided extending between the other side in the seat vertical direction of the respective supporting members, and an interval between the pair of supporting members, at portions at which the fabric spring member is fixed, is narrower at the connecting member side than at the spanning member side.

In the vehicle seat of the second aspect, the pair of supporting members are connected by the connecting member at one sides in the seat vertical direction. Before the spanning member is provided so as to span across, the other sides are not restrained. Namely, by moving the other sides of the pair of supporting members away from one another by using the connecting member sides, which are the one sides, as fulcra, tension can be imparted to the fabric spring member that is stretched between the pair of supporting members. When the pair of supporting members are moved away from one another, the spanning member sides thereof move away from one another more greatly than the connecting member sides thereof do. Namely, in a case in which the distance between the supporting members does not change over the seat vertical direction, the elongation rate of the fabric spring member in the seat transverse direction becomes greater the further toward the spanning member side. Therefore, the elastic force becomes greater the further toward the spanning member side.

In contrast, in the vehicle seat of the second aspect, the interval between the supporting members is formed to be more narrow at the connecting member sides than at the spanning member sides thereof. Therefore, the elongation rate of the fabric spring member in the seat transverse direction can be standardized at the seat upper side and the seat lower side, and the elastic force at the fabric spring member can be standardized.

In a vehicle seat of a third aspect, a fabric spring unit that is independent from the frame member is configured by at least the supporting members, the fabric spring member and the spanning member, and the fabric spring unit is supported at the frame member.

The vehicle seat of the third aspect has the feature that the supporting members, the fabric spring member and the spanning member are made into an assembly. In accordance with the vehicle seat of the third aspect, in the process of assembling the fabric spring unit, tension can be imparted to the fabric spring member in the step of providing the spanning member so as to span across. In the mounting process in which the fabric spring unit is mounted to the frame member, there is no need to mount the fabric spring member while moving the pair of supporting members away from one another. Accordingly, manufacturing of the seat is facilitated.

In accordance with the present disclosure, load to the neck portion of a vehicle occupant can be reduced.

BRIEF DESCRIPTION OF THE DRAWINGS

Exemplary embodiments of the present disclosure will be described in detail based on the following figures, wherein:

FIG. 5 is a drawing (a cross-sectional view along line 5-5 of FIG. 4) for explaining operation of the vehicle seat relating to the comparative example.

DETAILED DESCRIPTION

Figure 1:
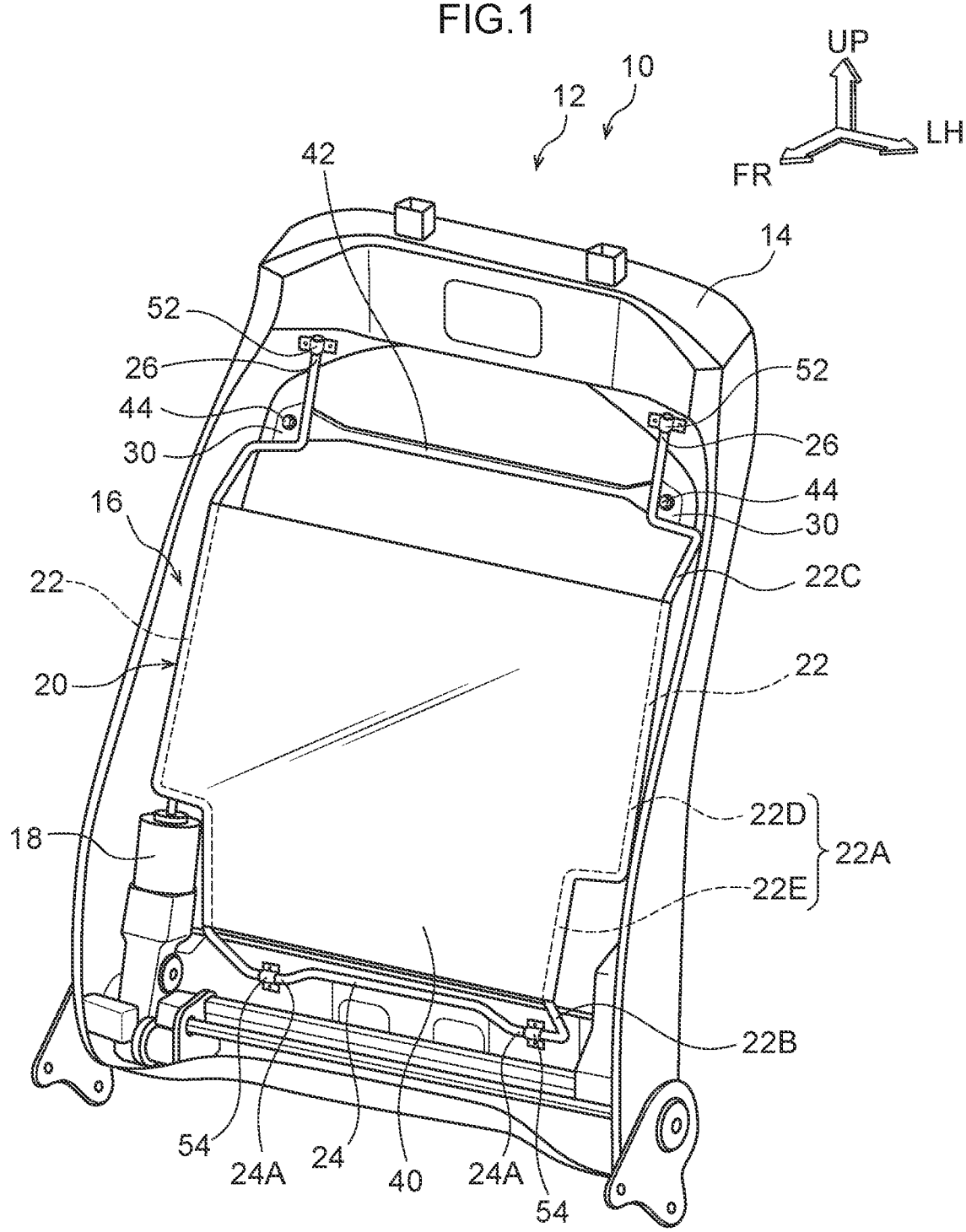
FIG. 1 is a perspective view showing the internal structure of a seatback at a vehicle seat relating to a present embodiment.

A vehicle seat 10 (hereinafter called seat 10) relating to an embodiment of the present disclosure is described on the basis of FIG. 1 through FIG. 3. Note that arrow FR, arrow UP and arrow LH that are shown appropriately in the respective drawings indicate the forward direction, the upward direction and the leftward direction of the seat 10 relating to the present embodiment, respectively. Further, in the present embodiment, the forward direction, the upward direction and the leftward direction of the seat 10 coincide with the forward direction, the upward direction and the leftward direction of the vehicle in which the seat 10 is installed.

(Structure)

The seat 10 relating to the present embodiment has a seat cushion (not illustrated) on which a vehicle occupant sits, and a seatback 12 that is provided upright from the seat rear side end portion of the seat cushion and that holds the upper body of the vehicle occupant. As shown in FIG. 1, a frame 14 that surrounds the seat vertical direction and the seat transverse direction is provided at the seatback 12. A fabric spring unit 16 (see FIG. 2) is provided at the inner side (the seat vertical direction inner side and the seat transverse direction inner side) of the frame 14. The fabric spring unit 16 is supported at the frame-shaped frame 14 at the seat upper side and the seat lower side. Further, a motor 18 for tilting the seatback 12 is accommodated at the seat lower side and the seat transverse direction right side of the seatback 12.

Figure 2:
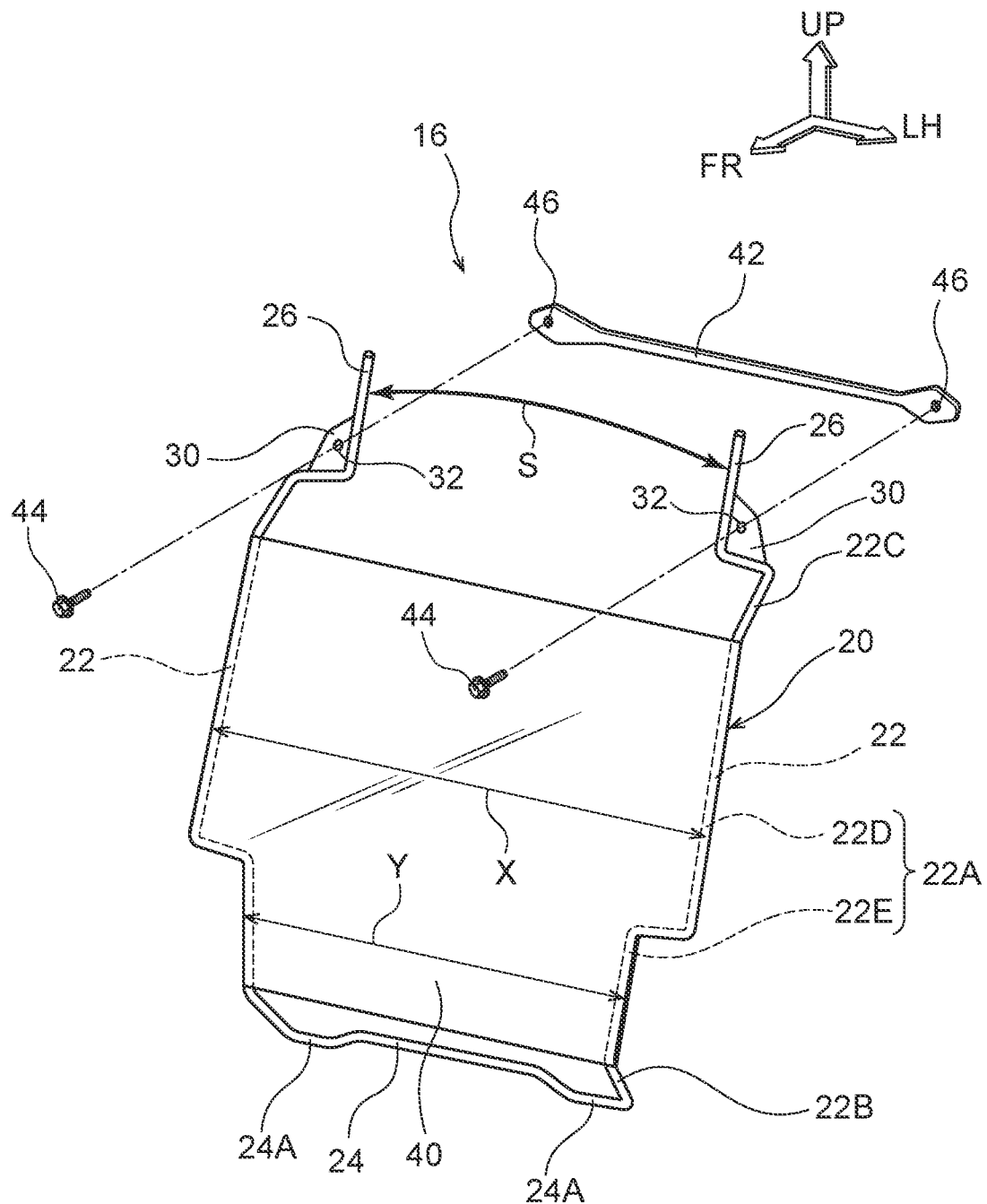
FIG. 2 is an exploded perspective view of a fabric spring unit that is provided at the seatback relating to the present embodiment.
Figure 3:
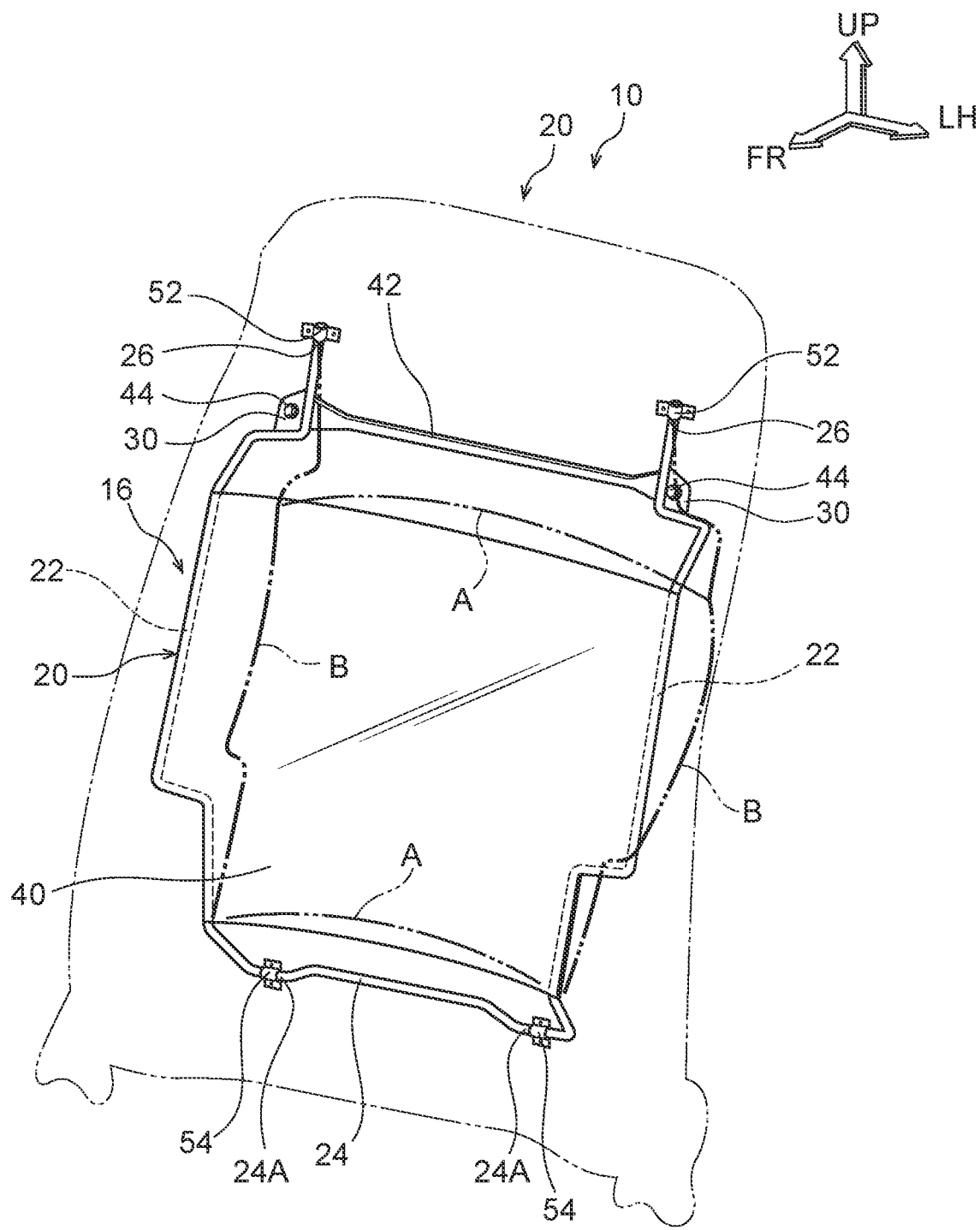
FIG. 3 is a perspective view for explaining operation of the vehicle seat relating to the present embodiment.

As shown in FIG. 2, the fabric spring unit 16 is an assembly that has elasticity and that supports the upper body of the vehicle occupant who is seated in the seat 10. The fabric spring unit 16 is configured to include a stay 20 that is substantially U-shaped and whose seat upper side is open as seen in a front view, a fabric spring member 40 that is stretched by the stay 20, and a tension imparting bar 42 that is provided so as to span across the seat upper side of the stay 20.

The stay 20 is a rod-shaped member that is formed from a spring steel, and has vertical frame portions 22, which are a pair of supporting members that extend in the seat vertical direction and are provided so as to be aligned in the seat transverse direction, and a lateral frame portion 24 that is a connecting member that extends in the seat transverse direction and connects the lower ends of the vertical frame portions 22. As seen in side view, the vertical frame portions 22 are substantially bow-shaped and protrude toward the seat front side. Each of the vertical frame portions 22 has a fixing portion 22A that is the portion to which the fabric spring member 40 is fixed, a lower edge portion 22B that is connected to the seat lower side of the fixing portion 22A, and an upper edge portion 22C that is connected to the seat upper side of the fixing portion 22A.

The fixing portion 22A has an upper fixing portion 22D that extends in the seat vertical direction, and a lower fixing portion 22E that, after being bent toward an inner side in the seat transverse direction at the lower end of the upper fixing portion 22D, extends toward the seat lower side. The upper fixing portion 22D constitutes approximately two-thirds of the fixing portion 22A at the seat upper side, and the lower fixing portion 22E constitutes approximately one-third of the fixing portion 22A at the seat lower side. Here, at the pair of vertical frame portions 22, a distance Y between the lower fixing portions 22E is shorter than a distance X between the upper fixing portions 22D. In the present embodiment, interference with the motor 18 is avoided (see FIG. 1) as a result of the right side of the stay 20 being absent due to the lower fixing portion 22E.

The lower edge portion 22B is inclined, from the lower end of the lower fixing portion 22E, toward the seat rear side on progression toward the seat lower side. The lower end of the lower edge portion 22B is connected to the lateral frame portion 24.

The upper edge portion 22C is inclined, from the upper end of the upper fixing portion 22D, toward the seat rear side on progression toward the seat upper side, and is bent, and extends, toward an inner side in the seat transverse direction, and thereafter, is bent, and extends, toward the seat upper side. A distal end portion 26, which is the upper end of the upper edge portion 22C, is nipped by a nipping member 52 that is a band-shaped bracket provided at the seat upper side of the frame 14 (see FIG. 1). The nipping members 52 correspond to the first nipping members. Due thereto, the stay 20 is supported at the vertical frame portions 22 so as to be able to slide in the seat vertical direction. Instead of the nipping members 52, a configuration may be adopted in which the stay 20 is supported by the distal end portions 26 being inserted into holes that are provided in the seat vertical direction at the frame 14. Further, at the upper edge portions 22C, flanges 30, which are plate-shaped, are fixed by welding or the like to corner portions that are bent from seat transverse direction inner side end portions toward the seat upper side.

Further, the lateral frame portion 24 is formed in a substantial bow-shape that protrudes toward the seat upper side as seen in front view. Portions that extend in the seat transverse direction at outer sides in the seat transverse direction of the lateral frame portion 24, are formed as side edge portions 24A. The side edge portions 24A are nipped by nipping members 54 that are band-shaped brackets provided at the seat lower side of the frame 14 (see FIG. 1). The nipping members 54 correspond to the second nipping members. Due thereto, the stay 20 is supported so as to be able to rotate in the seat front-rear direction with the side edge portions 24A as the axis of the rotation.

The fabric spring member 40 is made of a fabric material that has elasticity, such as an elastic textile or the like, and both seat transverse direction ends thereof are fixed, by adhesion or sewing or the like, to the fixing portions 22A of the vertical frame portions 22. At the fabric spring unit 16, the fabric spring member 40 is stretched in the seat transverse direction, and an initial tension is imparted thereto from a no-load state in which there is no load from a vehicle occupant.

The tension imparting bar 42 is a rod member that is made of metal, and is provided so as to span from one to the other of the pair of vertical frame portions 22 at the stay 20.

Specifically, the tension imparting bar 42 is fixed to the stay 20 by being fixed to the flanges 30 of the vertical frame portions 22 by screws 44.

(Manufacturing Method)

In the method of manufacturing the seat 10 of the present embodiment, the process of assembling the fabric spring unit 16 and the process of mounting the fabric spring unit 16 to the seatback 12 are as follows.

In the method of assembling the fabric spring unit 16, first, the fabric spring member 40 is affixed to the stay 20. In detail, the fabric spring member 40 is fixed by adhesion or sewing or the like to the fixing portions 22A of the stay 20. At this time, the fabric spring member 40 is fixed to the fixing portions 22A while being spread in the seat transverse direction. Accordingly, at the stay 20, the vertical frame portions 22 attempt to approach one another in a state in which the vertical frame portions 22 are not supported in any way. Here, the seat lower side end portions of the vertical frame portions 22 of the present embodiment are restrained by the lateral frame portion 24. Therefore, at the stay 20, before the fabric spring member 40 is affixed, the distal end portions 26 are near to the seat transverse direction inner side.

Next, the tension imparting bar 42 is provided so as to span across the stay 20. As described above, the distal end portions 26 at the stay 20 are near to the seat transverse direction inner side. Therefore, a worker spreads the pair of vertical frame portions 22 toward the seat transverse direction outer sides (refer to arrow S in FIG. 2), and makes the holes 32, which are formed in the flanges 30 of the stay 20, and screw holes 46, which are formed in the seat transverse direction outer sides of the tension imparting bar 42, coincide with one another. Then, due to the screws 44 that have been inserted-through the holes 32 being screwed-together with the screw holes 46, the tension imparting bar 42 is fixed to the stay 20 and spans thereacross. Due thereto, the fabric spring unit 16, in which the stay 20, the fabric spring member 40 and the tension imparting bar 42 are made integral, is assembled.

Next, the process of mounting the fabric spring unit 16 to the frame 14 is described. A worker fixes the nipping portions 54 to the frame 14 such that the side edge portions 24A of the lateral frame portion 24 are nipped by the frame 14 and the nipping members 54. Further, the worker fixes the nipping members 52 to the frame 14 such that the distal end portions 26 of the vertical frame portions 22 are nipped by the frame 14 and the nipping members 52. The fabric spring unit 16 is supported due to the stay 20 being fixed to the frame 14 at the side edge portions 24A and the distal end portions 26.

(Operation and Effects)

Operation of the seat 10 of the present embodiment at the time of a rear collision of the vehicle is as follows.

First, when the seat 10 receives acceleration toward the vehicle front side due to the vehicle being collided-with from the rear, the vehicle occupant receives acceleration toward the vehicle rear side relative to the seat 10. Therefore, the back portion of the vehicle occupant is pushed strongly against the seatback 12. Accompanying this, the fabric spring member 40 elastically deforms due to the load from the vehicle occupant. In detail, as shown in FIG. 3, the fabric spring member 40 bulges toward the seat rear side (refer to two-dot chain line A). Further, at the time when the fabric spring member 40 receives the load, the stay 20 also elastically deforms. In detail, the vertical frame portions 22, which are substantially bow-shaped and protrude-out toward the seat front side, flex such that the seat rear sides thereof protrude-out (refer to two-dot chain lines B).

At this time, at the stay 20, because the side edge portions 24A are tiltably supported by the nipping members 54, tilting of the stay 20 in the seat front-rear direction due to the flexing of the vertical frame portions 22 is not impeded. Further, because the distal end portions 26 of the stay 20 are slidably supported by the nipping members 52, at the time when the vertical frame portions 22 flex, sliding of the distal end portions 26 in the seat vertical direction is not impeded. Due to the above, when the vertical frame portions 22 of the stay 20 flex due to load of the vehicle occupant, it is difficult for the effects of the load to extend all the way to the frame 14.

Figure 4:
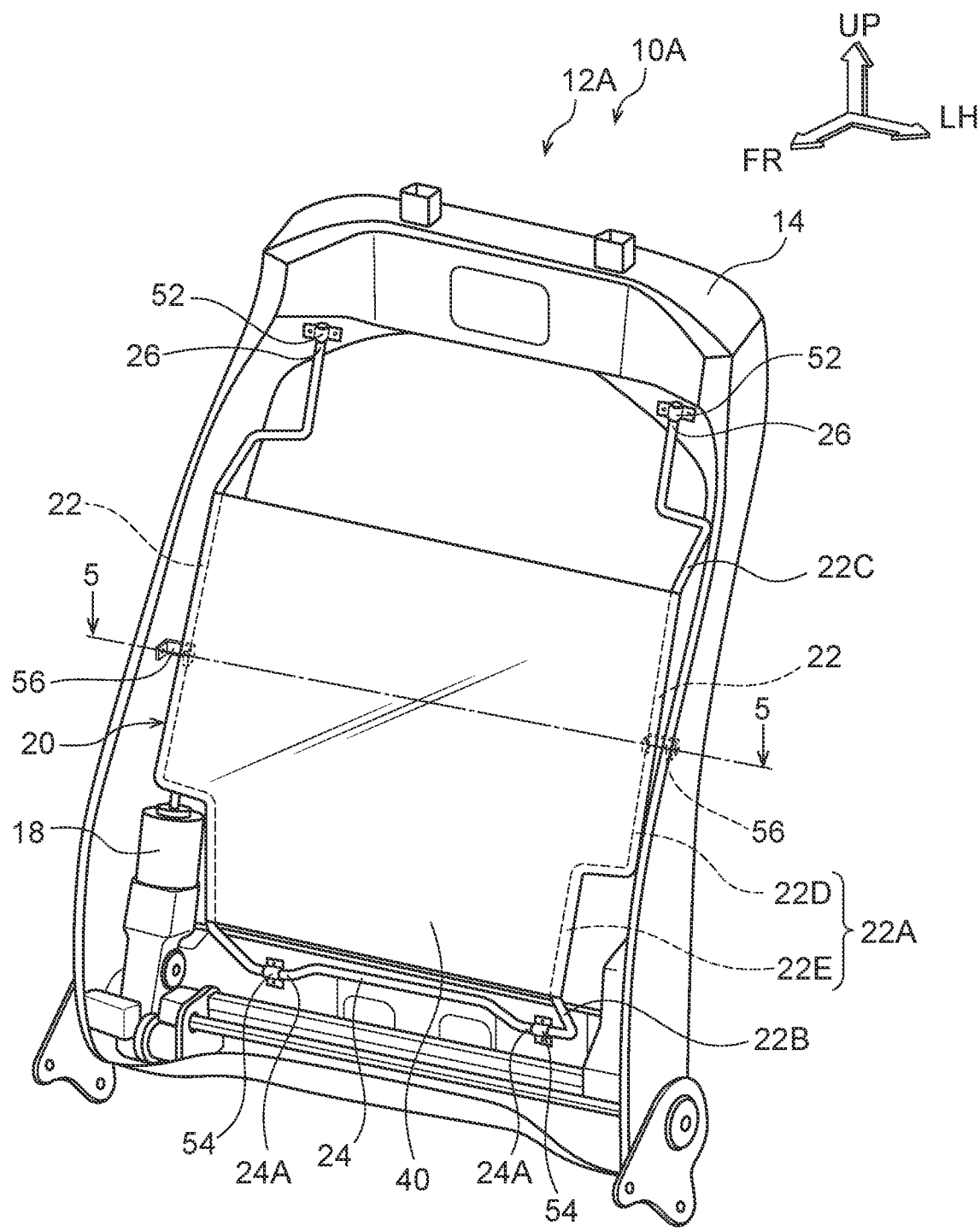
FIG. 4 is a perspective view showing the internal structure of a seatback in a vehicle seat relating to a comparative example.

Here, a seat 10A, that does not use the tension imparting bar 42 and in which an initial tension is imparted to the fabric spring member 40 by brackets (catching members 56) that are provided at the frame 14, is shown in FIG. 4 and FIG. 5 as a comparative example that is for comparison with a conventional structure. Note that structures that are the same as those of the present embodiment are denoted by the same reference numerals.

As shown in FIG. 4, in the seat 10A of the comparative example, the stay 20, to which the fabric spring member 40 has been affixed, is assembled to the frame 14 without a tension imparting bar being provided so as to span between the vertical frame portions 22 of the stay 20. At the time of this assembling, the worker causes the seat upper side of the stay 20 to be supported by the nipping members 52 and the seat lower side to be supported by the nipping members 54, respectively, and, at the seat transverse direction outer sides, causes the upper fixing portions 22D to anchor on the catching members 56 which extend from the frame 14 toward the seat transverse direction inner side.

When the vehicle, in which is installed the seat 10A of the comparative example that has been assembled in this way, is collided with from the rear, the following operation arises at a seatback 12A. Namely, when the vehicle occupant receives acceleration toward the vehicle rear side relative to the seat 10A, and the back portion of the vehicle occupant is pushed strongly against the seatback 12A, the fabric spring member 40 elastically deforms due to load from the vehicle occupant P. Here, as shown in FIG. 5, the stay 20 is fixed to the frame 14 by the catching members 56 in a vicinity of the seat vertical direction center. Therefore, although the fabric spring member 40 bulges-out toward the seat rear side (refer to two-dot chain line C), the stay 20 cannot flex, and the load of the vehicle occupant P is transmitted from the stay 20 to the frame 14. Accordingly, the frame 14 moves together with the stay 20 (refer to two-dot chain lines D), and the seatback 12A is tilted rearward. Further, due to the distance between the headrest (not shown) and the head portion of the vehicle occupant P increasing, the load to the neck portion at the time when the head portion bends rearward increases.

In contrast, in the seat 10 of the present embodiment, the stay 20 flexes together with the fabric spring member 40. Therefore, the load of the vehicle occupant is absorbed as much as possible at the fabric spring unit 16. Namely, the vehicle occupant sinking into the seatback 12 at the time of a rear collision of the vehicle is not impeded, and it is difficult for the load of the vehicle occupant to extend all the way to the frame 14. Accordingly, as compared with the comparative example, the frame 14 moving together with the stay 20 and the seatback 12 tilting backward are suppressed. As a result, in the present embodiment, the distance between the headrest (not illustrated) and the head portion of the vehicle occupant does not increase, and therefore, load to the neck portion at the time when the head portion bends rearward can be lowered. Namely, at the seat 10 of the present embodiment, whiplash of the vehicle occupant at the time of a rear collision of the vehicle can be suppressed.

Further, in the present embodiment, there is the feature that tension is imparted in the seat transverse direction to the fabric spring member 40 by the tension imparting bar 42. Here, the stay 20 of the present embodiment is formed in a substantial U-shape whose upper portion is open, as seen in a front view. Therefore, at the stay 20 before the tension imparting bar 42 is provided so as to span thereacross, the distal end portions 26 are not restrained in the seat transverse direction. Accordingly, at the stay 20, by moving the distal end portion 26 sides away from one another by using the lateral frame portion 24 sides as fulcra, tension can be imparted to the fabric spring member 40 that is stretched between the vertical frame portions 22.

On the other hand, at the stay 20 of the present embodiment, when the vertical frame portions 22 are moved away from one another, the distal end portion 26 sides are moved apart from one another more greatly than the lateral frame portion 24 sides. Namely, in a case in which the distance between the vertical frame portions 22 does not change over the seat vertical direction, the elongation rate of the fabric spring member 40 in the seat transverse direction becomes greater the further toward the distal end portions 26 side. Therefore, the elastic force becomes greater the further toward the distal end portions 26 side. Thus, at the stay 20 of the present embodiment, at the fixing portions 22A to which the fabric spring member 40 is affixed, the interval between the vertical frame portions 22 that face one another is narrower at the seat lower side than at the seat upper side. In detail, as shown in FIG. 2, the stay 20 is formed such that the distance Y between the lower fixing portions 22E is smaller than the distance X between the upper fixing portions 22D. Due thereto, the elongation rate of the fabric spring member 40 in the seat transverse direction can be standardized at the seat upper side and the seat lower side, and the elastic force of the fabric spring member 40 can be standardized.

Further, in the present embodiment, there is the feature that the fabric spring unit 16 is configured by the stay 20, the fabric spring member 40 and the tension imparting bar 42 being made integral. In a case in which tension is imparted to the fabric spring member 40 simultaneously with the assembling of the stay 20 to the frame 14 as in the comparative example, it is necessary to fix the stay 20 to the frame 14 while adjusting the position of the stay 20 and while spreading apart the vertical frame portions 22 in the seat transverse direction. In contrast, in the present embodiment, in the process of assembling the fabric spring unit 16, tension can be imparted to the fabric spring member 40 in the step of providing the tension imparting bar 42 so as to span across, and, at the time of mounting the fabric spring unit 16 to the frame 14, there is no need to spread the vertical frame portions 22 apart in the seat transverse direction. Namely, in accordance with the present embodiment, because it suffices to merely mount the stay 20 to the frame 14 while adjusting the position of the stay 20, the manufacturing of the seat 10 is easy as compared with the comparative example.

Moreover, in the present embodiment, because the imparting of tension to the fabric spring member 40 is completed at the fabric spring unit 16, in the state in which the stay 20 is assembled to the frame 14, force that is directed toward the seat transverse direction inner side does not arise at the distal end portions 26 of the vertical frame portions 22. Therefore, sliding resistance between the distal end portions 26 of the vertical frame portions 22 and the nipping members 52 provided at the frame 14 is suppressed, and the flexing movement of the vertical frame portions 22 is not impeded. Namely, in accordance with the present embodiment, by forming an assembly, the sinking-in action of the vehicle occupant into the seatback 12 at the time of a rear collision of the vehicle can be carried out smoothly.

(Other Embodiments)

As shown in FIG. 1, at the stay 20 of the present embodiment, the fabric spring member 40 is provided within the range of the ¾ at the seat lower side, and the fabric spring member 40 is not provided at the range that is at the ¼ at the seat upper side. Namely, a gap is provided between the vertical frame portions 22 (the upper edge portions 22C). This gap is for setting a device for air conditioning at the interior of the seatback 12. Accordingly, in a case in which a device for air conditioning is not to be provided at the interior of the seatback 12, the fabric spring member 40 may be provided over the entire range from the seat lower end portions of the vertical frame portions 22 to the flange 30 portions that the tension imparting bar 42 spans between.

Note that, in the present embodiment, the interval between the fixing portions 22A that face one another at the stay 20 is set to be in two steps, but the present embodiment is not limited to this. For example, the stay 20 may be formed such that there are three or more steps of the interval that is between the fixing portions 22A. Further, for example, the stay 20 may be formed such that the fixing portions 22A that face one another move away from one another while heading toward the seat upper side.

The fabric spring unit 16 of the present embodiment is configured to include the stay 20 that is substantially U-shaped and whose upper portion is open as seen in a front view, the fabric spring member 40 that is stretched at the stay 20, and the tension imparting bar 42 that is provided so as to span across the seat upper side of the stay 20. However, the fabric spring unit may be configured such that these elements are disposed upside-down as compared with their positions in the present embodiment. Moreover, the fabric spring unit may be configured so as to include a pair of rod members, a fabric spring member that is stretched between the pair of rod members, and tension imparting bars that are provided so as to span between the pair of rod members at the seat upper side and the seat lower side respectively.

What is claimed is:

1. A vehicle seat, comprising:
a frame member that structures a frame of a seatback;
a pair of supporting members that extend in a seat vertical direction, and that are supported by the frame member at a seat upper side and a seat lower side;
a fabric spring member that has elasticity and is stretched between the pair of supporting members;
a spanning member that is provided extending between the pair of supporting members, so as to impart tension to the fabric spring membered; and
a connecting member that extends in a seat transverse direction and connects the pair of supporting members at one side in the seat vertical direction of the respective supporting members, wherein:
the spanning member is provided extending between the other side in the seat vertical direction of the respective supporting members, and
an interval between the pair of supporting members, at portions at which the fabric spring member is fixed, is a narrower at the connecting member side than at the spanning member side.

2. The vehicle seat of claim 1, further comprising:
first nipping members that slidably nip the supporting members; and
second nipping members that slidably nip the connecting member.

3. The vehicle seat of claim 1, wherein:
a fabric spring unit that is independent from the frame member is configured by at least the supporting members, the fabric spring member and the spanning member, and
the fabric spring unit is supported at the frame member.

4. The vehicle seat of claim 1, wherein:
the supporting members comprise fixing portions that are portions at which the fabric spring member is fixed, and
the fixing portions comprise:
upper fixing portions that extend in the seat vertical direction, and
lower fixing portions that, after being bent from lower ends of the upper fixing portions toward an inner side in the seat transverse direction, extend toward a seat lower side.

5. The vehicle seat of claim 1, wherein the supporting members comprise:
fixing portions that are portions at which the fabric spring member is fixed, and
upper edge portions that are inclined from upper ends of the fixing portions toward a seat rear side on progression toward a seat upper side.

\* \* \* \* \*